(12) United States Patent
Willey et al.

(10) Patent No.: US 8,509,065 B2
(45) Date of Patent: *Aug. 13, 2013

(54) FLOW CONTROL BUFFERING

(75) Inventors: William Daniel Willey, Gilroy, CA (US); Thomas Leonard Trevor Plestid, Ottawa, CA (US); Muhammad Khaledul Islam, Ottawa, CA (US)

(73) Assignee: Research In Motion Limited, Waterloo (CA)

( * ) Notice: Subject to any disclaimer, the term of this patent is extended or adjusted under 35 U.S.C. 154(b) by 236 days.

This patent is subject to a terminal disclaimer.

(21) Appl. No.: 13/031,602

(22) Filed: Feb. 21, 2011

(65) Prior Publication Data

US 2011/0141896 A1 Jun. 16, 2011

Related U.S. Application Data

(63) Continuation of application No. 12/409,170, filed on Mar. 23, 2009, now Pat. No. 7,944,821, which is a continuation of application No. 11/000,866, filed on Dec. 1, 2004, now Pat. No. 7,529,184.

(51) Int. Cl.
*H04L 1/00* (2006.01)

(52) U.S. Cl.
USPC ........................................................ 370/229

(58) Field of Classification Search
USPC .......... 370/229–330, 235, 328–339, 412–413
See application file for complete search history.

(56) References Cited

U.S. PATENT DOCUMENTS

| 6,047,000 | A | 4/2000 | Tsang et al. |
| 7,043,249 | B2 | 5/2006 | Sayeedi |
| 7,411,903 | B2 | 8/2008 | Jang et al. |
| 7,634,237 | B2 | 12/2009 | Haralabidis et al. |
| 2003/0214931 | A1 | 11/2003 | Nakayasu |
| 2004/0009771 | A1 | 1/2004 | Leppanen et al. |

(Continued)

FOREIGN PATENT DOCUMENTS

| EP | 1385292 A2 | 1/2004 |
| JP | 07-038612 A | 2/1995 |

(Continued)

OTHER PUBLICATIONS

Chaudry et al, TSG-X, Flow Control Buffering Control, downloadable at http://ftp.3gpp2.org/TSGX, Oct 24, 2005.*

(Continued)

*Primary Examiner* — Frank Duong

(57) ABSTRACT

A method and system for improved buffering during a flow control event, the system comprising: a mobile station having a mobile timer; a radio network communicating wirelessly with the mobile station and including: a base station; and a packet control function (PCF) capable of interrupting the flow of data to the wireless device during the flow control event; a packet data serving node (PDSN) communicating with the PCF and having a buffer to store data received for the mobile station during the flow control event, the buffer having a buffer timer; and a push function communicating with the PDSN and having a retry timer to indicate when to resend an unacknowledged packet; wherein the system coordinates the buffer timer with either the mobile timer or the retry timer to eliminate redundant messages.

13 Claims, 5 Drawing Sheets

(56) References Cited

U.S. PATENT DOCUMENTS

| | | |
|---|---|---|
| 2004/0098657 A1 | 5/2004 | Jalali et al. |
| 2004/0235488 A1 | 11/2004 | Choi |
| 2005/0083926 A1 | 4/2005 | Mathews et al. |
| 2005/0141427 A1 | 6/2005 | Bartky |
| 2005/0141501 A1 | 6/2005 | Kadambi et al. |
| 2005/0226154 A1 | 10/2005 | Julka et al. |
| 2006/0007862 A1 | 1/2006 | Sayeedi et al. |
| 2006/0114821 A1 | 6/2006 | Willey et al. |
| 2006/0173982 A1 | 8/2006 | Bournas |

FOREIGN PATENT DOCUMENTS

| | | |
|---|---|---|
| JP | 11-041212 A | 2/1999 |
| JP | 2005-094371 A | 4/2005 |
| WO | 01/20930 A1 | 3/2001 |
| WO | 03/096730 A1 | 11/2003 |
| WO | 2004/014035 A1 | 2/2004 |

OTHER PUBLICATIONS

"Interoperability Specification (IOS) for cdma2000 Access Network Interfaces—Part 3 Features (3G-IOS v5.0)"; 3GPP2 A.S0013-C Version 0.4; Chapters 2.17.13; 3.17.5; and 3.17.11; dated Jun. 2004.

Farcasanu, et al., "TSG-X: Flow Control and Buffering Issues," 3rd Generation Partnership Project 2 "3GPP2" pp. 1-5.

Farcasanu, et al., "TSG-X: Flow Control and Buffering Issues,"3rd Generation Partnership Project 2"3GPP2" pp. 1-5.

Sayeedi, et al., "TSG-A: Flow Control Buffering Issues," 3rd Generation Partnership Project 2 "3GPP2" pp. 1-9.

Sayeedi, et al., "TSG-A: Buffering for Flow Controlled Packets," 3rd Generation Partnership Project 2 "3GPP2" pp. 1-9.

3GPP2 A.S0017-A, Interoperability Specification (IOS) for cdma2000 Access Network Interfaces—Part 7 (A10 and A11 Interfaces), 74 pages, Oct. 2002.

3GPP2 A30-20031013-00x, Flow Control, 23 pages, Oct. 2003.

\* cited by examiner

FLOW CONTROL BUFFERING

CROSS-REFERENCE OF RELATED APPLICATION

The present application is a continuation of U.S. patent application Ser. No. 12/409,170 filed on Mar. 23, 2009, which is a continuation of U.S. patent application Ser. No. 11/000,866 filed on Dec. 1, 2004, now U.S. Pat. No. 7,529,184, the contents of which are incorporated herein by reference.

FIELD OF THE APPLICATION

The present application is directed towards the field of flow control in a wireless communications network and in particular, the present application relates to the field of data buffering in the field of wireless protocol communications.

BACKGROUND

A flow control feature has been adopted by the third generation partnership project 2 ("3GPP2") standards that allows the packet control function (PCF) of the radio network (RN) to temporarily stop the flow of data from the packet data serving node ("PDSN"), as defined in 3GPP2 A.S0011-0017 and its revisions, and in 3GPP2 contribution A00-20040607-034 (including A00-20040607-034a, A00-20040607-034b, and A00-20040607-034c), the contents of which are hereby incorporated by reference. The proposal allows the radio network to send a flow control XOFF event to stop data transmission between a mobile station and the radio network. Events which can trigger this XOFF event include RN buffer overflow, hard handoff, paging failure, or voice precedence over packet ("VPOP"), among others.

According to the proposal, as a result of the XOFF event, the PDSN may temporarily stop the flow of data to the RN. In the current provision of TIA-835-D (X.P0011D), an optional flow control buffering capability has been added to the PDSN. This would allow the PDSN to buffer packets during the flow control event, which could last for a predetermined time period, for example 25 seconds.

The problem with the above solution is in cases where the buffering takes place for a longer period of time than an application layer retry timer on a push function. Specifically, a push function requires acknowledgement of packets sent and if these packets are not acknowledged within the duration of the retry timer, the packets are resent.

The push initiator protocol retry timer can be set depending on the type of service, the air interface or processing times of mobile devices. In the case where a retry timer is shorter than the duration of buffering at the PDSN, duplicate packets would be delivered to the PDSN and stored in the buffer. Once the flow control event has ceased, the buffer contents would be transmitted to the mobile device, including all of the redundant packets in the buffer.

As will be appreciated by those skilled in the art, the sending of redundant packets is costly from a number of points. Redundant packets waste network resources, the receiving and processing of these packets wastes battery life on the mobile station, if leased lines exist in the network between the push function and the PDSN, redundant packets increase the cost of this leased line, and duplicate packets could cause a cost to the end user.

SUMMARY

The present system and method overcome the deficiencies of the prior art by providing a way to coordinate the buffer timer in the PDSN with a second timer, the second timer being the retry timer of the push function or a mobile timer of a mobile station. The present method and system alternatively prevent the flow of data from the push function to the PDSN. This is done by sending a control message to the PDSN containing a retry timer value or mobile timer value, which the PDSN can then use to set a rolling buffer so that no duplicate packet sent by the push function is delivered to the mobile station. The buffer discards packets that are older than the second timer value, thereby eliminating data from the buffer and relying on the retry to obtain this data again. The above prevents redundant messages from being sent to the mobile station, thereby saving network resources between the PDSN and the mobile device, and further saving the battery life of the mobile device. The control message can either be sent from the push function or from the mobile device.

The mobile station may set the mobile timer by receiving a message from the push function (via a push function protocol) to indicate the push function retry value. Alternatively, the mobile station may be configured with the retry value for that specific push service, or may receive it from the PDSN accessed via a database. Additionally through this plurality of methods, a setting may be applied to indicate (initially during the session) whether a service requires flow control buffering at all. This retry timer and buffer request setting may be subsequently sent to the PDSN in order to indicate whether a particular push service should be buffered and if so, what that buffer timer value should be.

Alternatively, upon receipt of a flow control event from the packet control function (PCF) the value of the buffer timer can be forwarded to the push function and the push function can set the retry timer at its application layer to a value greater than the buffer timer. This prevents the resending of data packets during the flow control event, eliminating redundant packets and addresses the cost of sending packets from the push function to the PDSN.

In yet a further alternative, the PDSN can query a database for a retry timer value for the mobile device, and set the rolling buffer based on the value retrieved. A database operator will need to set and update values for the retry timer in this case. These values may be applied against particular subscription profiles that utilize particular push service.

The present application therefore provides a method of improved buffering during a flow control event in a network having a push function, a packet data serving node (PDSN), a packet control function (PCF) and a mobile device, comprising the steps of: coordinating a buffer timer in the PDSN with a second timer value, the second timer value coming from one of the push function, the mobile station or a database.

The present application further provides A method of improved buffering during a flow control event in a network having a push function, a packet data serving node (PDSN), a packet control function (PCF) and a mobile device, comprising the steps of: sending a control message from either the mobile station or the push function to the PDSN; receiving a flow control event message from the PCF at the PDSN; forwarding a buffer timer value from the PDSN to the push function; and setting a retry timer at the push function to a value greater than the buffer timer value.

The present application further provides a system for improved buffering during a flow control event, the system comprising: a mobile station having a mobile timer; a radio network communicating wirelessly with the mobile station and including: a base station; and a packet control function (PCF) capable of interrupting the flow of data to the wireless device during the flow control event; a packet data serving node (PDSN) communicating with the PCF and having a buffer to store data received for the mobile station during the flow control event, the buffer having a buffer timer; and a push function communicating with the PDSN and having a retry timer to indicate when to resend an unacknowledged packet; wherein the system coordinates the buffer timer with either the mobile timer or the retry timer to eliminate redundant messages.

BRIEF DESCRIPTION OF THE DRAWINGS

The present application will be better understood with reference to the drawings in which.

DETAILED DESCRIPTION OF THE DRAWINGS

Figure 1:
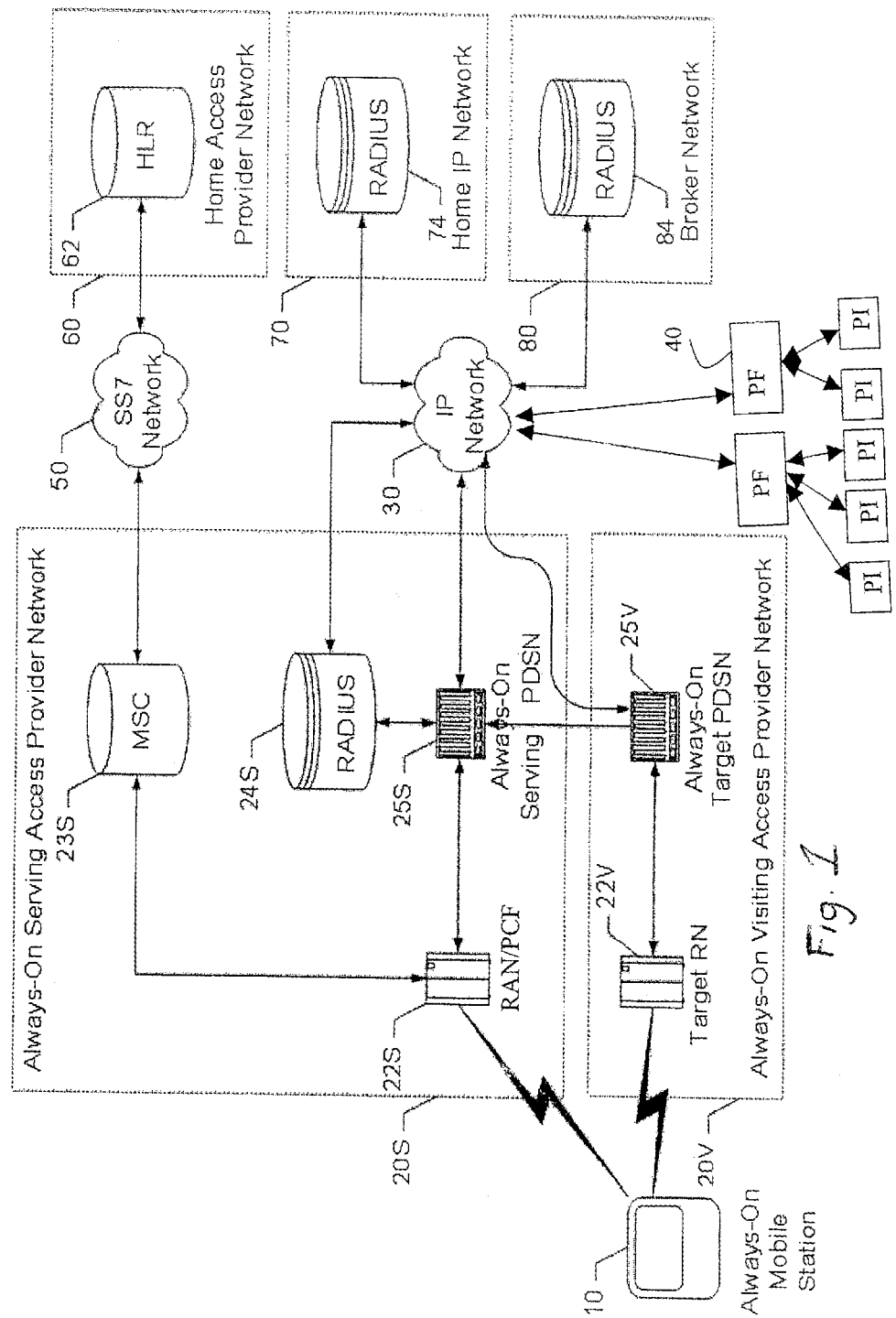
FIG. 1 shows an embodiment of the system for wireless always-on IP communications.

Referring to the drawings, FIG. 1 is a diagram of a wireless system having always-on components. As will be appreciated by those skilled in the art, the present system and method do not need to be always-on, and push services in general do not need to be always-on. The text below referencing FIG. 1 is merely exemplary of one type of system the present system and method can be used with.

An always-on mobile station (MS) 10 communicates over an internet protocol (IP) network 30 with push function 40 via at least one always-on access provider network (APN) cooperating with a back-end infrastructure, including a push function and push initiator as described below. A plurality of push initiators, as described below, communicate with push function 40.

Always-on MS 10 communicates with a first always-on visiting APN 20V, and is then handed off to a second always-on serving APN 20S. The always-on serving APN 20S communicates to back-end infrastructure including a home APN 60, a home IP network 70, and a broker network 80. Alternatively, the always-on MS 10 could communicate with back-end infrastructure directly via always-on serving APN 20S.

Both the always-on serving and visiting APNs 20S, 20V include known components such as a radio network (RN) 22S, 22V. As illustrated in the case of the serving APN 20S, known components include mobile switching centre (MSC) 23S which connects the source RN 22S with a home location register (HLR) 62 at the home APN 60 via signalling system 7 (SS7) network 50. Also known is remote authentication dial in user service (RADIUS) 24S that communicates with corresponding RADIUS components home RADIUS 74 and broker RADIUS 84 in the home IP network 70 and broker network 80 respectively.

Also known are the home IP network 70 and broker network 80, which are typically accessible over the same IP network 30 on which resides the push function 40. IP network can be any network, such as the internet or a private IP network or intranet.

Further details on the operation of these known components can be found in an TIA/EIA/IS-2000-1, TIA/EIA/IS-2000-2, TIA/EIA/IS-2000-3, TIA/EIAI/S-2000-4, TIA/EIA/IS-2000-5, 3GPP2 C.S0001, 3GPP2 C.S0002, 3GPP2 C.S0003, 3GPP2 C.S0004, 3GPP2 C.S0005, TIA/EIA/IS-707, 3GPP2 C.S0017, 3GPP2 X.S0011-C, 3GPP2 A.S0011-0017 and their revisions, which are incorporated herein by reference.

In addition to known components in always-on APN 20S, and always-on serving packet data serving node (PDSN) 25S is also known. The always-on serving PDSN 25S co-operates with the always-on MS 10 via an always-on target PDSN 25V at the always-on visiting APN 20V.

In alternative embodiments of the first aspect, APNs 20S and 20V need not be of the always-on variety, but rather it is sufficient that at least one APN which communicates with always-on MSN 10 be of an always-on type, the always-on MS and always-on APN both provided in accordance with the present application. To those skilled in the art, the above can be applied to any constrained packet data network such as 3GGP wireless LAN, dialup, etc.

Figure 2:
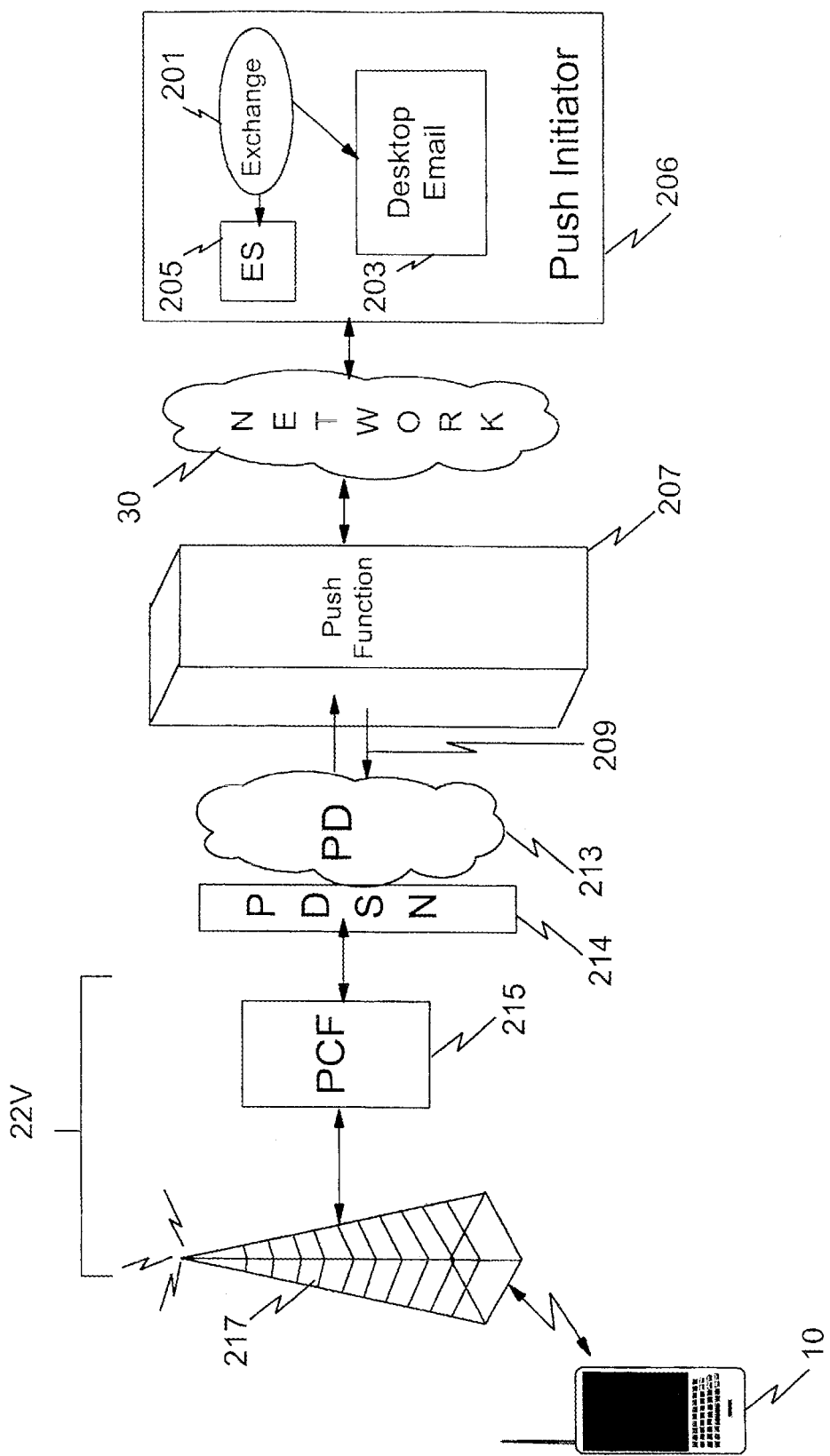
FIG. 2 is an exemplary diagram of a communications path for a push function communicating with a mobile station.

Reference is now made to FIG. 2. FIG. 2 shows a data flow diagram of an exemplary system for passing data packets between a push function 207 and a mobile station 10. The example of FIG. 2 is for email. However, as would be appreciated by one skilled in the art, any data service could be used. Push function 207 could be any application server sending acknowledged packets to mobile station 10.

Push initiator 206 receives an email in the example of FIG. 2 at exchange module 201. Exchange module 201 in turn provides the email message to both a desktop email 203 and to an enterprise server 205. Enterprise server 205 is responsible for passing the email message to mobile station 10.

Enterprise server 205 passes the email message through a network 30. Such networks, as described above, are known in the art and can include the internet, an intranet, a private IP network, or other networks known to those in the art.

Network 30 in turn passes the message to a push function 207, which routes the message through a communication channel 209 to a PDSN 214. In some applications, a firewall can exist between PDSN 214 and push function 207. A packet data cluster 213 can connect to a plurality of PDSNs, and thus push function 207 can connect to a plurality of PDSNs 214.

When a packet data serving node 214 receives a packet including at least a portion of an email message, it passes the packet through a radio network 22V to a mobile station 10. Radio network 22V comprises a packet control function (PCF) 215 and a base station 217. As would be known to those skilled in the art, other components of radio network 22V could also exist but are omitted from FIG. 2 for simplicity.

Communication channel 209 could include any communication channel, and in one embodiment includes a leased line between push function 207 and PDSN 214. As will be appreciated, the volume of data flowing across leased line 209 will determine the cost of the leased line to the operator.

Figure 3:
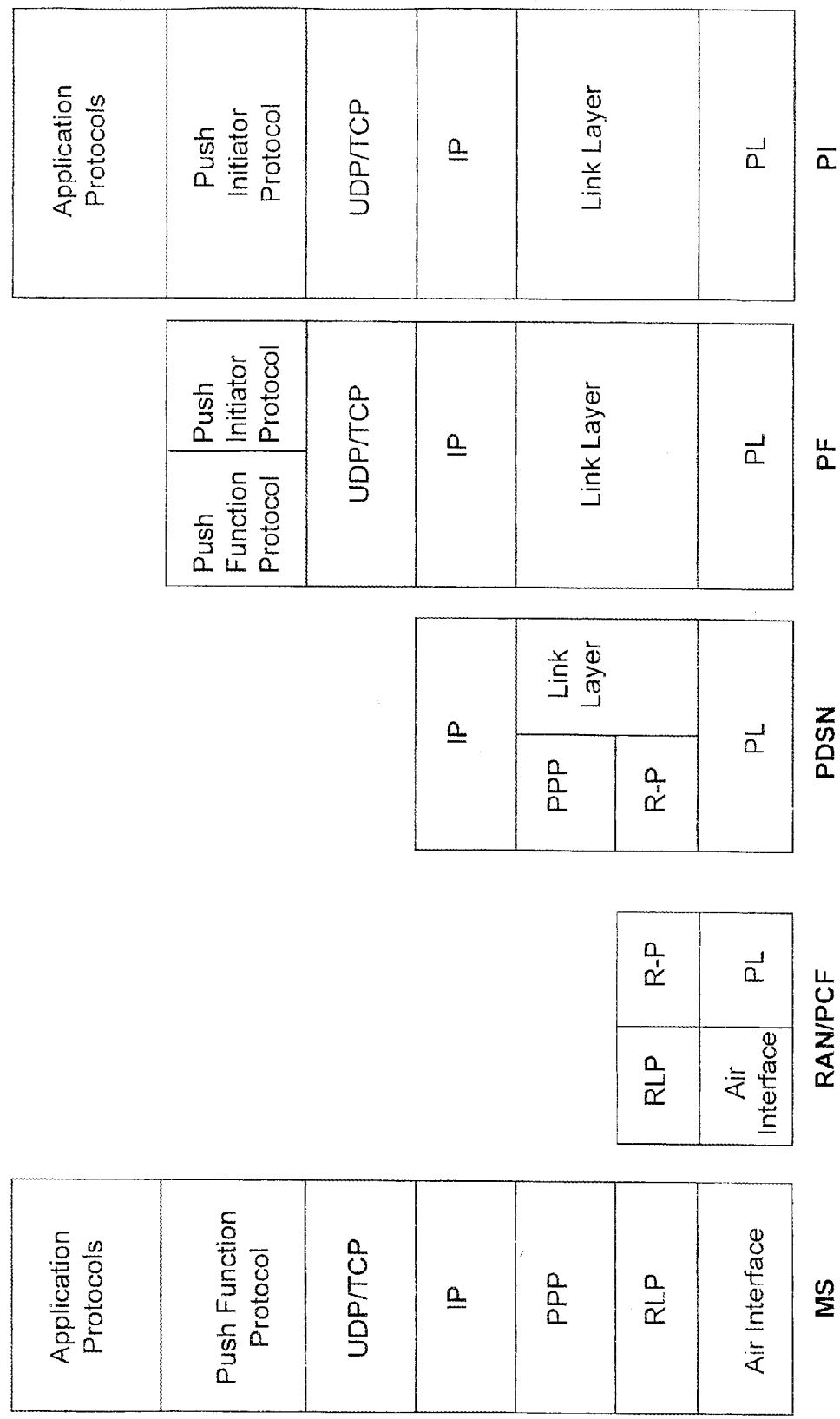
FIG. 3 is a protocol stack showing the transport between a push initiator and a mobile station.

FIG. 3 illustrates a protocol stack for the various protocols between a mobile station and a push initiator. As seen in this figure, the physical layer extends between the lowest level of the push initiator, push function, PDSN and to the radio network/PCF. At the RAN the physical layer becomes an air interface.

Similarly, the link layer extends between the push initiator, push function and PDSN. At the PDSN the link layer is divided into the point to point protocol session layer which exists between the mobile device and the PDSN, and the radio link protocol between the radio network and the mobile device.

The network layer in the example of FIG. 3 is an internet protocol (IP) layer and the transport layer is user datagram protocol/transmission control protocol (UDP/TCP).

In a preferred embodiment, the push initiator communicates with push function 207 through a push initiator protocol and push function 207 communicates with mobile station 10 through the push function protocol. As will be appreciated, the push initiator protocol and push function protocols are the transport on top of a UDP layer.

A global message over the application protocol exists between the push initiator and the mobile station 10 and works as a queue handler between the push function and the push initiator connections.

Referring again to FIG. 2, as will be appreciated by those skilled in the art if flow control exists, then network resources may be wasted and costs to the network, the user and the operator increased. Specifically, PCF 215 has the ability to communicate with a PDSN that a flow control event has occurred. With this message, under current proposals the PCF can send a flow control event timer value to indicate the duration of the flow control event and indicate to the PDSN whether or not to buffer data. If PDSN 214 is instructed to buffer data, all of the data arriving for mobile station 10 may be stored. As will be appreciated, the buffer timer may however be different from the flow control timer, and thus packets may be discarded if the buffer timer is shorter than the flow control timer. In an alternative embodiment a flow control timer may not be sent to the PDSN at all, and the buffer timer of the PDSN may therefore be shorter than the flow control event, leading to packets being discarded.

However, push function 207 includes a retry timer which, when expired before an acknowledgement to a packet sent from push function 207 is received, will cause the resending of that packet.

In an exemplary case, PCF 215 may indicate to the PDSN 214 that a flow control event has started and may optionally send to the PDSN a value for a flow control timer. This could, for example, be 15 seconds. The PDSN could then create a buffer with a timer value of 15 seconds and would thereby buffer all data sent to mobile station 10 for this time period. Other buffer values are possible though, and the buffer timer can be different from the flow control timer.

Push function 207 may however have a retry timer of only five seconds. In this case, push function 207, if sending a message at the very beginning of the flow control event, would not receive an acknowledgement to this data packet and after five seconds would resend it. Again, it would not receive an acknowledgement to this data packet within the second retry timer duration and would again send the packet. Thus, the PDSN 214 buffer would include three versions of the same packet.

When the flow control event is over, the buffer contents are then sent to mobile station 10 and mobile station 10 would receive three copies of the same packet. As will be appreciated, the flow control event could end based on an XON message being sent to PDSN 214 or a flow control timer could expire either at the PCF or the PDSN. Ideally, mobile station 10 would acknowledge the first packet and would discard the two redundant packets.

As will be appreciated by those skilled in the art, the sending of redundant packets wastes network resources. Capacity on leased line 209 is required for the redundant messages. Further, the limited air interface between base station 217 and mobile station 10 is required to pass these redundant messages. Also, mobile station 10 is required to receive and process the redundant messages causing unnecessary use of the battery of mobile station 10 and unfair billing to the end user.

It is therefore desirable to synchronize the buffer timer in PDSN 214 and the retry timer at the push function 207 if buffering is indicated. Further, if buffering is not indicated, it may be desirable to set a retry timer at push function 207 to correspond with the buffer timer.

Figure 4:
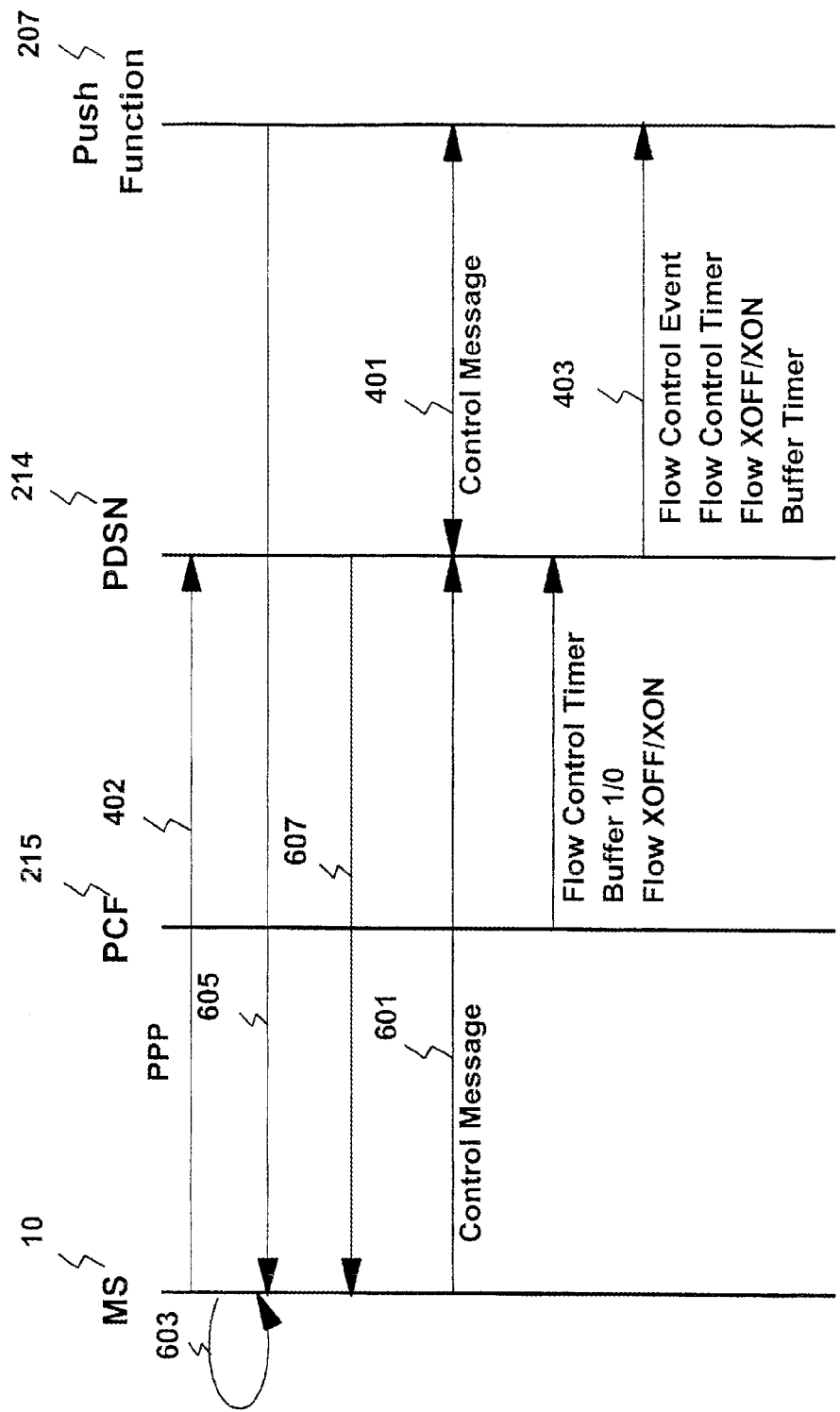
FIG. 4 is a diagram showing messages sent between a push function, PDSN and wireless device.

Reference is now made to FIG. 4. In a first embodiment, synchronization can occur at the establishment of the point to point protocol (PPP) session 402 with the mobile station 10 or at a change in the PPP session. A control packet 401 can be sent between the PDSN 214 and the push function 207 including various information, including the maximum packets the push function can send before acknowledgement is required, or the packet acknowledgement timeout value. This is also referred to above as the retry timeout.

The retry timeout can be either a static value for all devices or it can be customized based on device type and air interface between mobile station 10 and base station 217. Values based on the microprocessing delay can also be incorporated in the retry timer value.

In a first embodiment, the PDSN 214 can receive a message from PCF 215 relaying whether a flow control event has started or stopped, optionally a flow control timer value, and also optionally whether the PDSN should buffer packets. Alternatively the flow control timer value can be statically set at the PDSN. PDSN 214 can, rather than setting its buffer timer based on the buffer indicator sent by the PCF or statically set, instead create a rolling buffer with a buffer timer based on the retry timer value of push function 207. The rolling buffer would discard packets that have existed in the buffer for longer than the buffer timer value. When the flow control event finishes, the buffer contents are then forwarded to the mobile station.

The effect of the above is that any packets that are older than the retry timer I value are discarded and the packets sent by push function 207 on retry are ultimately forwarded to mobile station 10. Mobile station 10 thus does not receive any redundant packets, saving network resources between the PDSN and the mobile station 10 and further saving battery life on mobile station 10.

In one embodiment, PCF 215 can relay an XON message to PDSN 214 to indicate that the flow control event is over prior to the expiration of the flow control timer. The PDSN 214 can then, prior to the expiration of the buffer timer, begin sending packets that are buffered.

The above presents an improvement over the prior art but may, in certain situations, be a component of a larger solution, as follows. Messages between push function 207 and PDSN 214 also have a cost and in many cases it would be desirable to avoid this cost of sending redundant messages. The above solution would still require push function 207 to send all of the packets on retry, thus using resources such as communication channel 209.

Referring again to FIG. 4, an alternative would be that once PDSN 214 receives a control packet 401 from push function 207, it stores this control packet instruction. Thereafter, on receiving a flow control event from PCF 215, the PDSN then forwards the flow control event buffer timer value and flow control timer value if known to push function 207 in a message 403. This message to push function 207 may also include low XON/XOFF information and tells the push function to set the retry timer to a value greater than the buffer timer.

On a flow control event, PCF 215 optionally transmits the flow control timer to the PDSN, which then passes the buffer timer value to push function 207. Push function 207 then does not try to resend packets until either the expiration of the buffer timer or until it knows that the flow control event is over. The push function may know that the flow control event is over through either an XON message sent by PDSN 214 or by the expiry of a flow control timer in the push function if the push function received a flow control timer from PDSN 214.

By doing this, redundant messages are not sent across communications channel 209, and the buffer in PDSN 214 does not contain redundant packets that are sent to mobile station 10.

As will be appreciated by those skilled in the art, the push function 207 does not necessarily need to set the retry timer to a static value based on the flow control timer or the buffer timer. As long as the retry timer is longer than the flow control timer or buffer timer, messages could be resent at any time. The push function could thus take into account the type of service and the information about the mobile's processing delay in order to determine the optimal retry timer.

Figure 5:
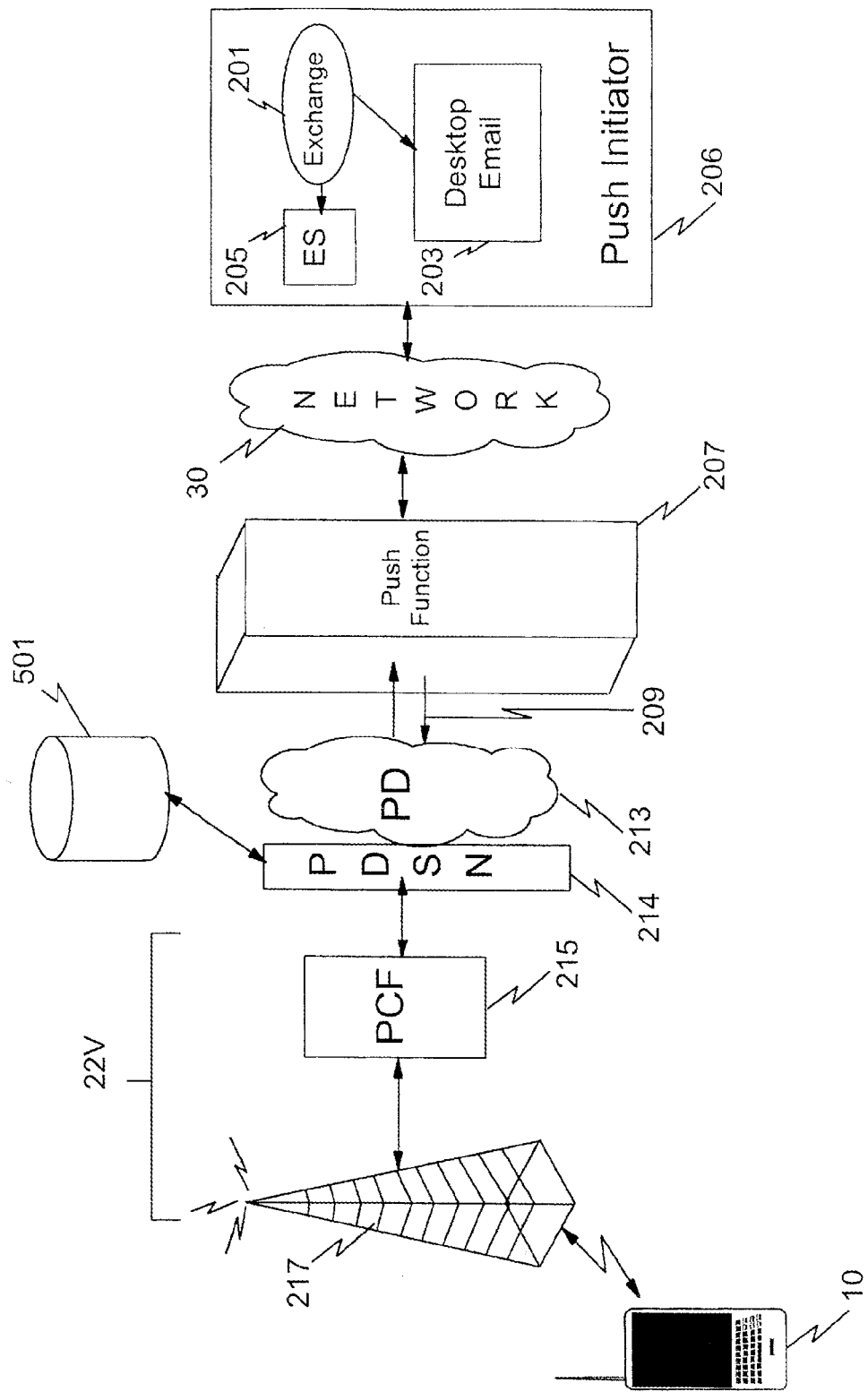
FIG. 5 is an alternative embodiment of the communications path of FIG. 2 including a database.

Referring now to FIG. 5, in yet a further alternative embodiment, the PDSN could, rather than relying on communications with push function 207, acquire a retry value from a database 501. Preferably, the retry timer values are static for a PPP session, and at the establishment of the PPP session on a subscription basis, the PDSN obtains a retry value from database 501.

As will be appreciated by those skilled in the art, database 501 can include a simple static value for all retry values, or can be more complex if the operator knows the device type and air interface and thus have the retry timer set based on these parameters. In some cases, PDSN 214 can only maintain one buffer for a mobile station 10, and in this case the buffer timer can be set to the longest retry timer value obtained from database 501. In other embodiments, the PDSN can have different timers based on the source identifier address of incoming packets. In this case each buffer can have a different buffer timer.

In a preferred embodiment, database 501 is the authentication, authorization and accounting database (AAA) and as seen in FIG. 1, is part of home IP network 70.

Alternatively, database 501 can receive retry timer values from push function 207 at the time of the establishment of a data session.

Referring again to FIG. 4, a further alternative embodiment is to set values at the PDSN from mobile station 10 during the PPP session 402 establishment or at other times during the PPP session. A mobile station 10 has one or more mobile timers that preferably mirror the retry timers of its push function. In some cases, mobile station 10 will already know about these retry timer values at PPP startup time and can inform the PDSN through a new message 601 of all the timeouts for all the push functions serving mobile station 10. The mobile station 10 can know these values statically if programmed into the mobile station or provisioned to the mobile station, as seen by message 603 in FIG. 4. Alternatively, mobile station 210 may know these values through a message 607 from the PDSN 214 or through a message 605 from push function 207. If a push function uses different protocols, various values for various protocols could be sent to the PDSN in the message 601. Message 601 could therefore, in one embodiment also include a protocol identifier to distinguish the various protocols.

Message 601 can thus be sent to PDSN 214 including a mobile station timer. As with the above, if the PCF 215 indicates a flow control event has started and sends a flow control timer to the PDSN 214, the PDSN 214 can either set its buffer timer to the value received from the mobile station 10 or, alternatively, send the flow control event to the push function and have the push function set its retry timer based on the PDSN's chosen buffer timer.

In one embodiment, PDSN 214 could set buffer parameters based on message 601 from mobile station 10 and on other control parameters. These other control parameters could include a buffer indicator from either the mobile station or the PCF indicating whether to buffer, along with the mobile timer value that the PDSN can set its own buffer timer to.

As will further be appreciated by those skilled in the art, customization can occur based on various factors. For example, the PDSN can be told by either the push function, a value received from the database, or from the mobile station that if the source IP address of an incoming packet is the IP address of push function A, to set the buffer timer to a first value for that packet. If the IP source address of an incoming packet is the IP address of push function B, the PDSN could be told to set the buffer timer value to a second value for that packet. If the IP source address of an incoming packet is the IP address of push function C, the PDSN can be told to discard all data arriving from that push function. Various combinations could therefore be used to customize the buffering of data. A mobile station, for clarity, may also indicate to the PDSN 214 that no buffering is required at all. Further, as described above, different protocols sent from a push function can require different buffering timers.

The above therefore describes a method and system for reducing the cost of redundant packets in a wireless network during a flow control event. A buffer timer in a PDSN is synchronized with the retry timer in a push function by either creating a rolling buffer in the PDSN to remove redundant messages or by synchronizing the retry timer with the flow control timer in order to avoid sending redundant messages.

The above can be implemented on any cost constrained network such as GPRS, wireless LAN, wireline networks that may implement intranet (Intra PLMN—Public land mobile network), GGSN (GPRS Gateway Serving Node), or other networks known to those skilled in the art. In these cases the PDSN corresponds with the GGSN$_{[R2]}$ and the PCF corresponds with PCU (Packet Control Unit) that resides with the base station controller.

The above described embodiments of the present application are meant to be illustrative of preferred embodiments and are not intended to limit the scope of the present application. Various modifications, which would be readily apparent to one skilled in the art, are intended to be within the scope of the present application. The only limitations to the scope of the present application are set forth in the claims appended hereto.

We claim:

1. A method in a network node of a wireless communications network, said method comprising:
   receiving a message from a mobile device, the message including a timer value;
   configuring flow control parameters at the network node based upon at least the timer value; and
   buffering packets in accordance with the flow control parameters, wherein packets buffered for longer than the timer value are not delivered.

2. The method of claim 1, wherein the message is received during establishment of a point to point protocol (PPP) session or at a change in a PPP session.

3. The method of claim 1, wherein the timer value is a mobile timer value provisioned on the mobile station.

4. The method of claim 1, wherein the timer value is associated with an application layer retry timer of a push service.

5. The method of claim 1, wherein said operation of buffering packets includes at least the operations of:
   buffering packets received for the mobile station while flow control is enabled; and
   discarding packets older than the timer value.

6. The method of claim 5, further comprising:
receiving from a radio network of the wireless communications network, a request to enable flow control to stop transmission of packets to the mobile station via the radio network; and
enabling flow control at the network node.

7. A method in a mobile device that receives packets from a push service via a wireless communications network having a network node, wherein the network node is configured to buffer packets according to flow control parameters, said method comprising:
establishing a packet data session with the network node of the wireless communications network; and
sending a message to the network node, the message including a timer value for modifying the flow control parameters; and
receiving packets from the network node, wherein the packets have not been buffered for longer than the timer value.

8. The method of claim 7, wherein the timer value is a mobile timer value provisioned on the mobile station.

9. The method of claim 7, wherein the timer value is associated with an application layer retry timer of the push service.

10. The method of claim 7, further comprising:
prior to sending the message to the network node, receiving a configuration message from the push service, the configuration message including at least the timer value.

11. The method of claim 7, further comprising:
prior to sending the message to the network node, determining the timer value based upon one or more retry timer values provisioned on the mobile station.

12. A push service comprising:
an application server configured to send packets to a mobile device via a wireless communications network, wherein the wireless communications network includes at least a network node that buffers packets according to flow control parameters at the network node; and
a retry timer configured to cause the resending packets that are not acknowledged prior to expiration of the retry timer,
wherein the retry timer and the flow control parameters are coordinated, such that packets are not buffered at the network node for longer than the retry timer.

13. The push service of claim 12, wherein the retry timer is set according to at least one of a static value for all mobile devices, a maximum buffer time in the network node, a type of mobile device, an air interface used by the mobile station, and values based on processing delay of the mobile device.

* * * * *